(12) United States Patent
Franke et al.

(10) Patent No.: US 7,668,901 B2
(45) Date of Patent: Feb. 23, 2010

(54) METHODS AND SYSTEM USING A LOCAL PROXY SERVER TO PROCESS MEDIA DATA FOR LOCAL AREA USERS

(75) Inventors: Michael Martin Franke, San Francisco, CA (US); Johnathan Bailey Gamble, San Francisco, CA (US); William Russell Henshall, San Francisco, CA (US); Aaron Sasha Cabral Jacobs, Oakland, CA (US); Matthew Donaldson Moller, San Francisco, CA (US); Dimitri Vandellos, San Carlos, CA (US)

(73) Assignee: Avid Technology, Inc., Tewksbury, MA (US)

( * ) Notice: Subject to any disclaimer, the term of this patent is extended or adjusted under 35 U.S.C. 154(b) by 966 days.

(21) Appl. No.: 10/123,331

(22) Filed: Apr. 15, 2002

(65) Prior Publication Data
US 2003/0195924 A1 Oct. 16, 2003

(51) Int. Cl.
*G06F 15/16* (2006.01)
(52) U.S. Cl. .................. 709/203; 709/204; 709/223; 709/231; 709/219; 709/225; 713/188; 713/176; 713/187; 370/401; 370/389; 726/22; 726/30
(58) Field of Classification Search ......... 709/201–205, 709/212–219, 249, 227, 238, 231, 223, 225; 713/200–201; 714/25–26; 707/1, 513, 500, 707/203, 204; 705/52

See application file for complete search history.

(56) References Cited

U.S. PATENT DOCUMENTS
5,379,374 A 1/1995 Ishizaki et al.
(Continued)

FOREIGN PATENT DOCUMENTS
EP 0933906 4/1999
(Continued)

OTHER PUBLICATIONS

Balasubramaniam, S., et al. "What is a File Synchronizer", Mobicom '98 Proceedings of the 4th Annual ACM/IEEE International Conference on Mobile Computing and Networking, Dallas, TX, Oct. 25-30, 1998, annual ACM/IEEE International Conference on Mobile Computing and Networking , New York, NY, Oct. 25, 1998, pp. 98-108.
Berra, P. Bruce et al., "Data and Knowledge Management in Multimedia Systems", IEEE Transaction Knowledge and Data Engineering, vol. 10, No. 6, Nov./Dec. 1998.
Berra, P.B., et al., "Issues in Networking and Data Management of Distributed Multimedia Systems", IEEE, 1992.
(Continued)

*Primary Examiner*—Jude J Jean Gilles
(74) *Attorney, Agent, or Firm*—Oliver Strimpel

(57) ABSTRACT

Methods and system are disclosed to minimize inefficiencies for local area users to share and access data. A local proxy server operates in conjunction with a central server. Local area users can post or store ("store") data, e.g., media data, on the local proxy server in order for the data to be accessed locally. The local proxy server can also store the data from the local area users on a central server. Additionally, the local proxy server can copy data being stored on the central server for local access by the local area users. In this manner, local area users can utilize the benefits (e.g., higher bandwidth and faster download speed) of storing and accessing media data to and from a local area source (i.e., the local proxy server).

59 Claims, 12 Drawing Sheets

U.S. PATENT DOCUMENTS

| | | | |
|---|---|---|---|
| 5,392,400 | A | 2/1995 | Berkowitz et al. |
| 5,420,974 | A | 5/1995 | Morris et al. |
| 5,617,539 | A | 4/1997 | Ludwig et al. |
| 5,644,714 | A | 7/1997 | Kikinis |
| 5,680,400 | A | 10/1997 | York |
| 5,680,609 | A | 10/1997 | Reinhardt |
| 5,727,155 | A | 3/1998 | Dawson |
| 5,784,561 | A | 7/1998 | Bruno et al. |
| 5,796,424 | A | 8/1998 | Ely et al. |
| 5,805,821 | A | 9/1998 | Saxena et al. |
| 5,811,706 | A | 9/1998 | Van Buskirk et al. |
| 5,841,977 | A | 11/1998 | Ishizaki et al. |
| 5,872,923 | A | 2/1999 | Schwartz et al. |
| 5,880,788 | A | 3/1999 | Bregler |
| 5,886,274 | A | 3/1999 | Jungleib |
| 5,896,506 | A | 4/1999 | Ali et al. |
| 5,912,697 | A | 6/1999 | Hashimoto et al. |
| 5,926,205 | A | 7/1999 | Krause et al. |
| 5,930,473 | A | 7/1999 | Teng et al. |
| 5,937,162 | A | 8/1999 | Funk et al. |
| 5,950,198 | A | 9/1999 | Falls et al. |
| 5,952,599 | A | 9/1999 | Dolby et al. |
| 5,995,491 | A | 11/1999 | Richter et al. |
| 6,014,694 | A | 1/2000 | Aharoni et al. |
| 6,044,205 | A | 3/2000 | Reed et al. |
| 6,061,717 | A | 5/2000 | Carleton et al. |
| 6,085,251 | A | 7/2000 | Fabozzi, II |
| 6,101,507 | A | 8/2000 | Cane et al. |
| 6,105,055 | A | 8/2000 | Pizano et al. |
| 6,128,644 | A * | 10/2000 | Nozaki ............... 709/203 |
| 6,128,652 | A | 10/2000 | Toh et al. |
| 6,154,600 | A | 11/2000 | Newman et al. |
| 6,166,735 | A | 12/2000 | Dom et al. |
| 6,173,377 | B1 | 1/2001 | Yanai et al. |
| 6,209,021 | B1 | 3/2001 | Ahimovic et al. |
| 6,212,549 | B1 | 4/2001 | Page et al. |
| 6,230,173 | B1 | 5/2001 | Ferrel et al. |
| 6,233,600 | B1 | 5/2001 | Salas et al. |
| 6,237,025 | B1 | 5/2001 | Ludwig et al. |
| 6,243,676 | B1 | 6/2001 | Witteman |
| 6,263,507 | B1 | 7/2001 | Ahmad et al. |
| 6,266,691 | B1 | 7/2001 | Watanabe et al. |
| 6,269,080 | B1 | 7/2001 | Kumar |
| 6,269,394 | B1 | 7/2001 | Kenner et al. |
| 6,275,937 | B1 | 8/2001 | Hailpern et al. |
| 6,288,739 | B1 | 9/2001 | Hales et al. |
| 6,295,058 | B1 | 9/2001 | Hsu et al. |
| 6,308,204 | B1 | 10/2001 | Nathan et al. |
| 6,310,941 | B1 | 10/2001 | Crutcher et al. |
| 6,314,454 | B1 | 11/2001 | Wang et al. |
| 6,317,777 | B1 | 11/2001 | Skarbo et al. |
| 6,320,600 | B1 | 11/2001 | Smith et al. |
| 6,321,252 | B1 | 11/2001 | Bhola et al. |
| 6,324,544 | B1 | 11/2001 | Alam et al. |
| 6,332,153 | B1 | 12/2001 | Cohen |
| 6,338,086 | B1 | 1/2002 | Curtis et al. |
| 6,343,313 | B1 | 1/2002 | Salesky et al. |
| 6,351,467 | B1 | 2/2002 | Dillon |
| 6,351,471 | B1 | 2/2002 | Robinett et al. |
| 6,356,903 | B1 | 3/2002 | Baxter et al. |
| 6,373,926 | B1 | 4/2002 | Foladare et al. |
| 6,397,230 | B1 | 5/2002 | Carmel et al. |
| 6,405,256 | B1 | 6/2002 | Lin et al. |
| 6,421,685 | B1 | 7/2002 | Nishikawa |
| 6,430,567 | B2 | 8/2002 | Burridge |
| 6,438,611 | B1 | 8/2002 | Hara et al. |
| 6,442,604 | B2 | 8/2002 | Romine |
| 6,446,130 | B1 | 9/2002 | Grapes |
| 6,453,355 | B1 | 9/2002 | Jones et al. |
| 6,470,329 | B1 | 10/2002 | Livschitz |
| 6,507,845 | B1 | 1/2003 | Cohen et al. |
| 6,513,061 | B1 * | 1/2003 | Ebata et al. ............... 709/203 |
| 6,546,488 | B2 | 4/2003 | Dillon et al. |
| 6,549,934 | B1 | 4/2003 | Peterson et al. |
| 6,553,410 | B2 * | 4/2003 | Kikinis ............... 709/227 |
| 6,567,844 | B2 | 5/2003 | Fukasawa |
| 6,574,742 | B1 * | 6/2003 | Jamroga et al. ............... 713/400 |
| 6,598,074 | B1 | 7/2003 | Moller et al. |
| 6,604,144 | B1 | 8/2003 | Anders |
| 6,646,655 | B1 | 11/2003 | Brandt et al. |
| 6,665,835 | B1 | 12/2003 | Gutfreund et al. |
| 6,687,801 | B1 | 2/2004 | Kamvysselis |
| 6,711,611 | B2 * | 3/2004 | Hanhan ............... 709/218 |
| 6,728,886 | B1 * | 4/2004 | Ji et al. ............... 713/201 |
| 6,760,756 | B1 * | 7/2004 | Davis et al. ............... 709/215 |
| 6,782,412 | B2 | 8/2004 | Brophy et al. |
| 6,823,394 | B2 | 11/2004 | Waldvogel et al. |
| 6,912,591 | B2 * | 6/2005 | Lash ............... 709/246 |
| 6,937,581 | B1 | 8/2005 | Berger et al. |
| 7,069,296 | B2 | 6/2006 | Moller et al. |
| 2001/0011308 | A1 | 8/2001 | Clark et al. |
| 2001/0042111 | A1 * | 11/2001 | Douzono ............... 709/219 |
| 2002/0016776 | A1 * | 2/2002 | Chu et al. ............... 705/52 |
| 2002/0184252 | A1 | 12/2002 | Holtz et al. |
| 2002/0194295 | A1 | 12/2002 | Mercure et al. |
| 2002/0194442 | A1 | 12/2002 | Yanai et al. |
| 2003/0120685 | A1 | 6/2003 | Duncombe et al. |
| 2003/0140050 | A1 | 7/2003 | Li et al. |
| 2003/0195929 | A1 | 10/2003 | Franke et al. |
| 2004/0015456 | A1 | 1/2004 | Holtz et al. |
| 2004/0068523 | A1 | 4/2004 | Keith et al. |
| 2004/0093420 | A1 | 5/2004 | Gamble |
| 2004/0240842 | A1 | 12/2004 | Mahdavi |
| 2005/0044250 | A1 | 2/2005 | Gay et al. |
| 2005/0234961 | A1 | 10/2005 | Edvalson et al. |

FOREIGN PATENT DOCUMENTS

| | | |
|---|---|---|
| WO | WO 94/11858 | 5/1994 |
| WO | WO 01/22398 | 3/2001 |
| WO | WO 02/075539 | 9/2002 |
| WO | WO 02/077862 | 10/2002 |

OTHER PUBLICATIONS

Christoffel, J., "Bal-A Tool To Synchronize Document Collections Between Computers", Proceedings of the Eleventh Systems Administration Conf. (LISA XI) Usenix Association, Berkeley, California, Oct. 1997, pp. 85-88.

Ishikura et al . . . , "Multi connection TCP mechanism for high performance transport in an ATM Network", Broadband Communications, Global infrastructure for the information age, Proceedings Of the International IFIP-EEE conference on broadband communications, Canada 1996, London, Chapman and Hall, GB, Apr. 23, 1996, pp. 443-454.

Ramsey, Norman et al., "An Alegebraic Approach to File Synchronization", Software Engineering Notes, ACM USA, vol. 26, No. 5, Sep. 2001, pp. 175-185.

Moeller E., et al., "Distributed Processing Of Multimedia Information", IEEE Computer Society Proceedings, May 28, 1990-Jun. 1, 1990.

Paul R., et al., "Issues in Database Management of Multimedia Information", IEEE 1994.

Selected web pages from "Blue Mountain Greeting Cards", www.bluemountain.com, Dec. 10, 1997.

Selected web pages from Egreetings, www.egreetings.com, Dec. 21, 1996.

Selected web pages from "MessageMates", www.messagemates.com, Jan. 25, 1999.

Selected web pages from "Quark Digital Media Systems", www.quark.com., Oct. 9, 2001.

* cited by examiner

METHODS AND SYSTEM USING A LOCAL PROXY SERVER TO PROCESS MEDIA DATA FOR LOCAL AREA USERS

RELATED APPLICATION

This application is related to U.S. patent application Ser. No. 10/123,332 entitled, "METHODS AND SYSTEM USING SECONDARY STORAGE TO STORE MEDIA DATA ACCESSIBLE FOR LOCAL AREA USERS," filed on Apr. 15, 2002. The disclosure of this application is hereby expressly incorporated by reference.

FIELD

This invention relates generally to data sharing systems and, more particularly, to methods and system using a local proxy server to process media data for local area users.

BACKGROUND

Data sharing capabilities have increased tremendously with the popularity of wide area networks (WANs) such as the Internet. For example, disparate users in different countries or continents can share large amounts of shared data. Shared data may include multimedia data, audio data, and/or video data, typically in the form of large data files. Data sharing applications are commonly used to store or "post" shared data on a central server connected to the Internet for access by other users. Thus, a user can access the posted data via the central server.

One type of data sharing application is a "collaboration application." A collaboration application allows multiple users to work together on the same project from remote locations. For example, users in California and New York can work on the same project via the Internet through a collaboration application. Typically, in a collaboration application, a user "posts" or stores data for the project on the central server connected to the Internet. Other users connected to the Internet can then request the posted data from the central server. The central server processes these requests to provide the users with posted data for collaboration purposes.

This configuration is suitable for users in remote locations. However, one limitation with such a configuration is that it is inefficient for multiple users collaborating on a project from the same local area, e.g., users on a local area network (LAN). Often, communicating with a central server can be slow. For example, if the central server is experiencing a high volume of traffic, the central server will be slow in delivering requested data to LAN users. Low bandwidth connections to the central server can exacerbate the situation. Thus, requiring local area users to download data from only a central server inefficiently uses network resources when the data may already exist locally. Furthermore, multiple local area users collaborating on a project using such a configuration can result in data being downloaded multiple times, causing further inefficient use of local area resources.

There exists, therefore, a need to allow local area users a fast and efficient manner of accessing posted data.

SUMMARY

Methods and system consistent with the invention, as embodied and broadly described herein, allow local area users to store and access data to and from a local proxy server.

Consistent with the invention, one method is disclosed for implementing collaboration between a plurality of users operating a media application for processing media data. The users are interconnected via a first network and connected to a second network. The second network includes a central server and the first network includes a selectively enabled local proxy server. The method comprises determining if the local proxy server is enabled. Media data is stored on the local proxy server and stored on the on the central server by the local proxy server if the local proxy server is enabled.

Consistent with the invention, another method is disclosed for implementing collaboration between a plurality of users operating a media application for processing media data. Each user has access to a central server and to at least one selectively enabled local proxy server. Each local proxy server is accessible to only a subset of the users. The method comprises determining if the local proxy server is enabled. The media data is stored on the local proxy server and stored on the central server by the local proxy server if the local proxy server is enabled.

Consistent with the invention, another method is disclosed for implementing collaboration between a plurality of users operating a media application for processing media data. Each user has access to a central server and to at least one selectively enabled local proxy server. The method comprises determining if the local proxy server is enabled. If the local proxy server is enabled, the media data is stored on the local proxy server. The media data includes an identifier. The media data with the identifier is stored on the central server by the local proxy server.

Consistent with the invention, another method is disclosed for implementing collaboration between a plurality of users on a network operating a media application for processing media data. Each user has access to a central server. The method comprises connecting a local proxy server to the network. The local proxy server is selectively enabled. At least one user is configured to recognize the enabled local proxy server and to post media data for the media application on at least one of the central server and the enabled local proxy server.

DESCRIPTION OF THE DRAWINGS

The accompanying drawings, which are incorporated in, and constitute a part of the specification, illustrate implementations of the invention and, together with the detailed description, serve to explain the principles of the invention. In the drawings.

DETAILED DESCRIPTION

Reference will now be made in detail to implementations of the invention, examples of which are illustrated in the accompanying drawings. Wherever possible, the same reference numbers will be used throughout the drawings to refer to the same or like parts.

The following implementations use a local proxy server to minimize inefficiencies for local area users to share and access data. The local proxy server operates in conjunction with a central server. Local area users can post or store data, e.g., media data, on the local proxy server in order for the data to be accessed locally. The local proxy server can also store the data from the local area users on a central server. Additionally, the local proxy server can copy or download data being stored on the central server for local access by the local area users. In this manner, local area users can utilize the benefits (e.g., higher bandwidth and faster download speed) of storing and accessing media data to and from a local area source (i.e., the local proxy server).

Exemplary System Configuration

Figure 1:
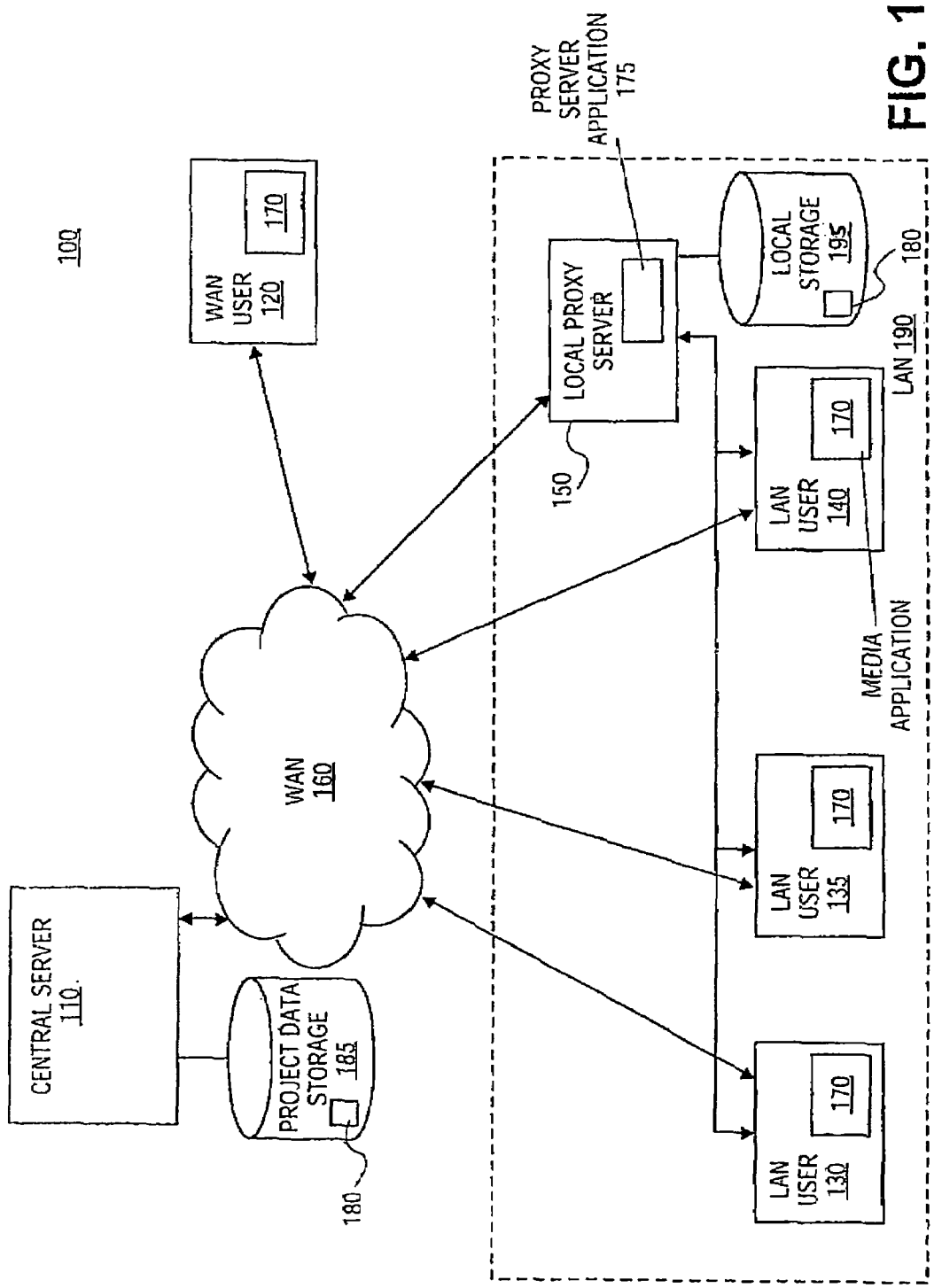
FIG. 1 is a block diagram of an exemplary system configuration for practicing the invention.

FIG. 1 is block diagram of an exemplary system configuration 100 for practicing the invention. System configuration 100 includes a plurality of users 130, 135, and 140 configured in a first network 190 such as, for example, a local area network (LAN) ("LAN 190"). Users 130, 135, and 140 are coupled to a central server 110 and user 120 via a second network 160 such as, for example, a wide area network ("WAN 160"). Within LAN 190, LAN users 130-140 are coupled to a local proxy server 150. Local proxy server 150 is a client of central server 110 and acts as intermediary between central server 110 and LAN users 130-140.

LAN users 130-140 and user 120 ("WAN user 120") can share data via WAN 160 and LAN 190. For example, LAN users 130-140 and WAN user 120 can share data by collaborating on a project including project data. Project data may comprise media data and object data. Media data is a component of a project and object data is "meta data" associated with a component or element of media data. Object data may embody a change to media data within a project. Examples of media data include digital audio and/or video data, MIDI data, text data, or large data files. Further details of media data and object data are described in FIG. 3.

The central server 110, LAN users 130-140 and WAN user 120, and local proxy server 150 will now be described. Central server 110 is a computing system that can communicate with LAN users 130-140, WAN user 120, local proxy server 150, and any other devices connected to WAN 160. Examples of such a computing system include Apple® Power Macintoshes or Intel® Pentium-based personal computers running a version of the Windows® operating system.

Central server 110 may include client/server software and/or hardware for implementing collaboration between LAN users 130-140 and WAN user 120. For example, central server 110 can store, manage, and distribute media data and object data in a project database to facilitate collaboration between users 130-140 and WAN user 120 on the same project using techniques described in U.S. Pat. No. 6,598,074 ("the '074 patent") entitled "SYSTEM AND METHOD FOR ENABLING MULTIMEDIA PRODUCTION COLLABORATION OVER A NETWORK," which was issued Jul. 22, 2003, and is assigned to the same assignee of this application.

Attached to central server 110 is a storage device ("project data storage 185") storing project data including media data ("media data 180"). Central server 110 can store other types of project data including object data in project data storage 185. In one implementation, central server 110 stores and manages media data and object data in a project database within project data storage 185. Examples of project data storage 185 include a hard disk, compact disc read/write (CD R/W) drives, tape drives, random access memory (RAM), or other like memory devices. Although one storage device is shown, any number of project data storage devices may be attached to central server 110.

To facilitate collaboration between users, central server 110 handles authentication tasks. For example, central server 110 can control which users (including local proxy server 150) are able to access or post project data (i.e., media data and object data) for a particular project. Central server 110 also provides notifications to users of available project data. For example, central server 110 can notify LAN users 130-140 and WAN user 120 (if all are collaborating on the same project) of posted media data and object data related to the project. Central server 110 can also notify local proxy server 150 of posted media data and object data. Central server 110 can notify these users or devices using techniques described in the '074 patent noted above. These users can thus request the media data or object data from central server 110 after being notified. Accordingly, central server 110 can provide media data and object data "on demand" or upon request by a user.

Central server 110 can also handle download requests of project data from LAN users 130-140, WAN user 120, and local proxy server 150. Central server 110 can send status updates to these users or devices regarding a status of a download request or if project data is being stored on central server 110. For example, if requested project data has not been completely stored or posted central server 110, central server 110 can send status updates to the users or devices connected via WAN 160. Although central server 110 is shown connected to WAN 160 outside of LAN 190, central server 110 can be located within LAN 190 to facilitate collaboration from within LAN 190.

Referring to FIG. 1, central server 110 stores media data from LAN users 130-140 or WAN user 120 as media data 180 in media storage 185. Central server 110 can receive media data 180 from LAN users 130-140 through local proxy server 150. For example, LAN users 130-140, when posting media data, can store media data on local proxy server 150. Local proxy server 150 can then store the media data for the users on central server 110 as media data 180. Alternatively, LAN users 130-140 can send media data directly to central server 110. The same process can be implemented for other types of data, e.g., object data.

LAN users 130-140 and WAN user 120 are computing systems, which may include the same type of computing system as central server 110. LAN users 130-140 and WAN user 120 include a media application 170 for sharing data. The users can use media application 170 to share data by collaborating on a project using media data and object data. For example, LAN users 130-140 and WAN user 120 can "log in" to central server 110 and navigate to a session regarding a project and collaborate on the project with other users using media application 170. Central server 110 may include one or more applications to communicate with media application 170.

Examples of media application 170 include Logic Audio from Emagic Inc. of Grass Valley, Calif. Cubase™ from Steinberg Soft-und Hardware GmbH of Hamburg, Germany; or ProTools™ from Digidesign™, Inc. of Palo Alto, Calif. Media application 170 may also be implemented as a client/server type application capable of sharing data with other users. Further details of the operation of media application 170 are described in FIG. 4.

Media application 170 can operate with one or more functions, procedures, routines, or application program interfaces (APIs) that allow media application 170 to collaborate, e.g., on a project, with other users and applications. For example, the collaboration system of Rocket Network, Inc. of San Francisco, Calif. can be implemented as an application program interface (API) to media application 170 in order for LAN users 130-140 and WAN user 120 users to collaborate on a project over WAN 160. This collaboration system can be based on the system described in the '074 patent noted above.

In one implementation, such a collaboration system is configured to communicate with a server application 175 operating within local proxy server 150. The collaboration system within LAN users 130-140 and WAN user 120 can be configured to recognize central server 110 and/or local proxy server 150 when sending or receiving project data as described below.

Within LAN 190, LAN users 130-140 can store media data (e.g., media data 180) on local proxy server 150 and store object data on central server 110. Alternatively, LAN users 130-140 can store both media data and object data on either central server 110 or local proxy server 150. If LAN users 130-140 post media data or object data on local proxy server 150, local proxy server 150 can forward or store the project data from the users on central server 110. Additionally, local proxy server 150 can copy or download media data or object being stored on central server 110. In this manner, LAN users 130-140 can copy project data being stored on central server 110 from local proxy server 150, thereby accessing project data locally, e.g., on LAN 190.

Local proxy server 150 is a computing system, which may include the same computing system as central server 110, LAN user 130-140, or WAN user 120. Attached to local proxy server 150 is a local storage 195. Local proxy server 150 can provide a shared storage system for LAN users 130-140 using local storage 195. Local proxy server 150 can store project data (e.g. media data ISO) in local storage 195 for LAN users 130-140, or, alternatively, any user connected to LAN 190 via one or more networks. The project data can be stored as one or more data files. Other users, e.g., WAN user 120 may also access data in local storage 195 from local proxy server 150.

Local storage 195 may represent a database storage system having one or more storage devices, a stand-alone storage device providing shared data access for LAN users 130-140, or other appropriate shared storage systems or devices. Alternatively, storage devices contained within local proxy server 150 may operate as a shared stored device. Local proxy server 150 can provide standard network data file sharing capabilities or read/write capabilities to files stored in local storage 195.

Local proxy server 150 can be selectively enabled for each individual LAN user 130-140 to permit storing and downloading of project data including media data 180 or object data (not shown) from local storage 195 using the methods described below. For example, an API operating with media application 170 can be configured to recognize local proxy server 150 and to send and receive project data from local proxy server 150.

Local proxy server 150 includes a server application 175, which can communicate with media application 170 to handle requests for media data or object data from LAN users 130-140 or store media data or object on central server 110 for the LAN users 130-140. Server application 175 can be software operating within local proxy server 150 to handle communications between central server 110 and LAN users 130-140. Server application 175 can maintain storage of media data ("media data 180") or object data (not shown) in local storage 195 as one or more data files for access by LAN users 130-140. Proxy server application 175 may also be used to transfer such data files to LAN users 130-140 or other users. Proxy server application 175 can be used to identify, organize, and reference data files in local storage 195.

Proxy server application 175 provides download status information to LAN users 130-140 if requested data files are being downloaded from central server 110. Proxy server application 175 can determine the location of data files being stored in local storage 195 using the same identifiers for data files generated by LAN users 130-140. Proxy server application 175 can also maintain a connection or session with central server 110 for LAN users 130-140. In one implementation, local proxy server 150, using proxy server application 175, can download project data, data files, or other types of data for LAN users 130-140 even if any of the users are not in a direct connection or session with a project maintained by central server 110.

Proxy server application 175 provides download status information to LAN users 130-140 if requested data files are being downloaded from central server 110. Proxy server application 175 can determine the location of data files being stored in local storage 190 use the same identifiers for data files generated by LAN users 130-140. Proxy server application 175 can also maintain a connection or session with central server 110 for LAN users 130-140. In one implementation, local proxy server 150, using proxy server application 175, can download project data, data files, or other types of data for LAN users 130-140 even if any of the users are not in a direct connection or session with a project maintained by central server 110.

Local proxy server 150 may also be accessible to central server 110 and WAN user 120. For example, central server 110 or WAN user 120 may store and download project data to and from local proxy server 150. Local proxy server 150 may operate with applications to identify, organize, and reference posted media data 180 for LAN users 130-140 or other users (e.g., WAN user 120). Local proxy server 150 may store media data 180 or other types of data (e.g., object data) in a compressed or uncompressed format and provide password protection for media data 180 or other types of data. In one example, LAN users 130-140 must logon to local proxy server 150 to access media data 180.

WAN 160 may be the Internet or a proprietary network. LAN 190 may be an Ethernet, Token Ring, ARCNET, fiber distributed data interface (FDDI) local area network, or other appropriate local area networks. Although not shown in FIG. 1, additional network devices may be connected to WAN 160 such as, for example, network routers, switches, hubs, or gateways. System configuration 100 is thus suitable for communicating data on LAN 190 and WAN 160 using standard local and wide area communication protocols.

The process of collaborating on a project by LAN users 130-140 and WAN user 120 will now be described. LAN users 130-140 and WAN user 120 logon onto a project via central server 110. To make contributions to the project, WAN user 120 can store project data on central server 110 and LAN users 130-140 can store project data on local proxy server 150, if enabled; otherwise to central server 110. If enabled, local proxy server 150 stores project data received from LAN users 130-140 on central server 110. In this manner, LAN users 130-140 only store project data once on local proxy server 150. Additionally, because project data is stored on local proxy server 150, project data can be accessed locally by LAN users 130-140. Central server 110, IAN users 130-140, WAN user 120, and local proxy server 150 can send and receive project data using techniques described in the '074 patent noted above.

To make a change to a project, e.g., to make a change to media data within the project, LAN users 130-140 and WAN user 120 can send object data embodying the change to central server 110. Central server 110 can distribute the object data to users or clients (including local proxy server 150) collaborating on the same project. LAN users 130-140 can also send object data to local proxy server 150, which can forward the object data from LAN users 130-140 to central server 110. Additionally, central server 110 can send object data to local proxy server 150, which can forward the object data from central server 110 to LAN users 130-140.

To download project data, LAN users 130-140 and WAN user 120 can request project data from central server 110 directly. LAN users 130-140 can also request project data from local proxy server 150. If local proxy server 150 does not contain the requested project data, local proxy server 150 can request it from central server 110 and then distribute it to LAN users 130-140. Local proxy server 150 can also mirror or store project data being stored on central server 110 by maintaining an active connection with central server 110.

Thus, in the example of FIG. 1, because media data 180 or other data can be mirrored or stored on local proxy server 150, LAN users 130-140 are capable of accessing media data 180 within LAN 190. Additionally, if, e.g., media data 180 is not stored in local storage 190, local proxy server 150 can request the data from central server 110 to make it accessible to LAN users 130-140. As such, the fast high-bandwidth qualities of a LAN are utilized for LAN users 130-140.

Exemplary Computer System

Figure 2:
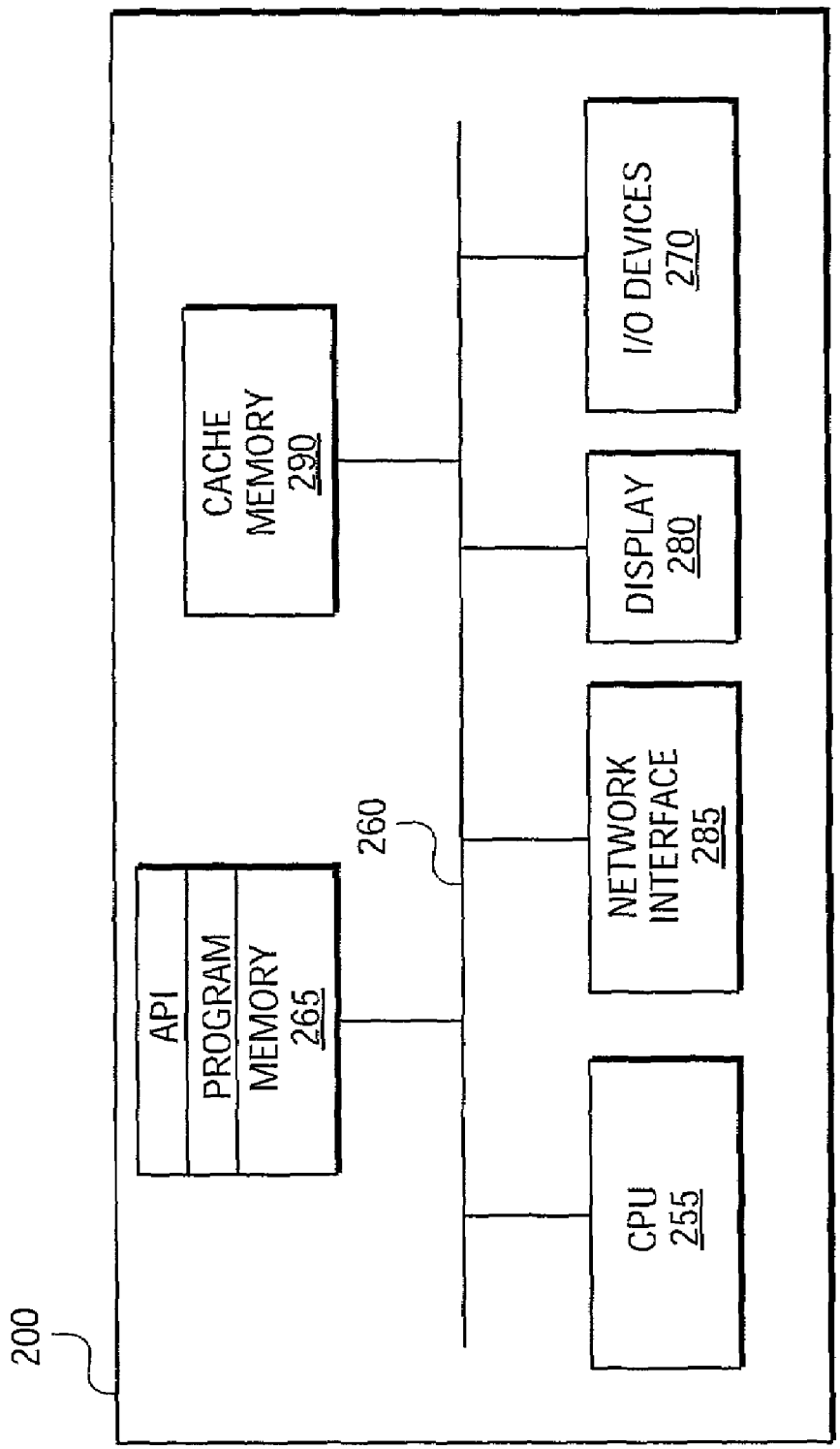
FIG. 2 is an internal block diagram of an exemplary computer system for implementing the invention.

FIG. 2 is an internal block diagram of an exemplary computer system 200 for implementing the invention. Computer system 200 may represent the internal components of LAN users 130-140, WAN user 120, central server 110, or local proxy server 150 as shown in FIG. 1. Computer system 200 can perform the functions required by media application 170, as described in the methods below.

Computer system 200 includes several components all interconnected via a system bus 260. An example of system bus 260 is a bi-directional system bus having thirty-two data and address lines for accessing a memory 265 and a cache memory 290 and for transferring data among the components. Alternatively, multiplexed data/address lines may be used instead of separate data and address lines. Examples of memory 265 and cache memory 290 include a random access memory (RAM), read-only memory (ROM), video memory, flash memory, or other appropriate memory devices. Additional memory devices may be included in computer system 200 such as, for example, fixed and removable media (including magnetic, optical, or magnetic optical storage media). These types of media may also operate as cache memory.

Computing system 200 may communicate with other computing systems (e.g., central server 110 or WAN user 120) via a network interface 285. Examples of network interface 285 include Ethernet or dial-up telephone connections. Computer system 200 contains a central processing unit (CPU) 255, examples of which include the Pentium® family of microprocessors manufactured by Intel® Corporation. However, any other suitable microprocessor, micro-, mini-, or mainframe type processor may be used for computer system 200. CPU 255 provides the support for storing and downloading media data and is configured to carry out the methods described below.

Figure 3:
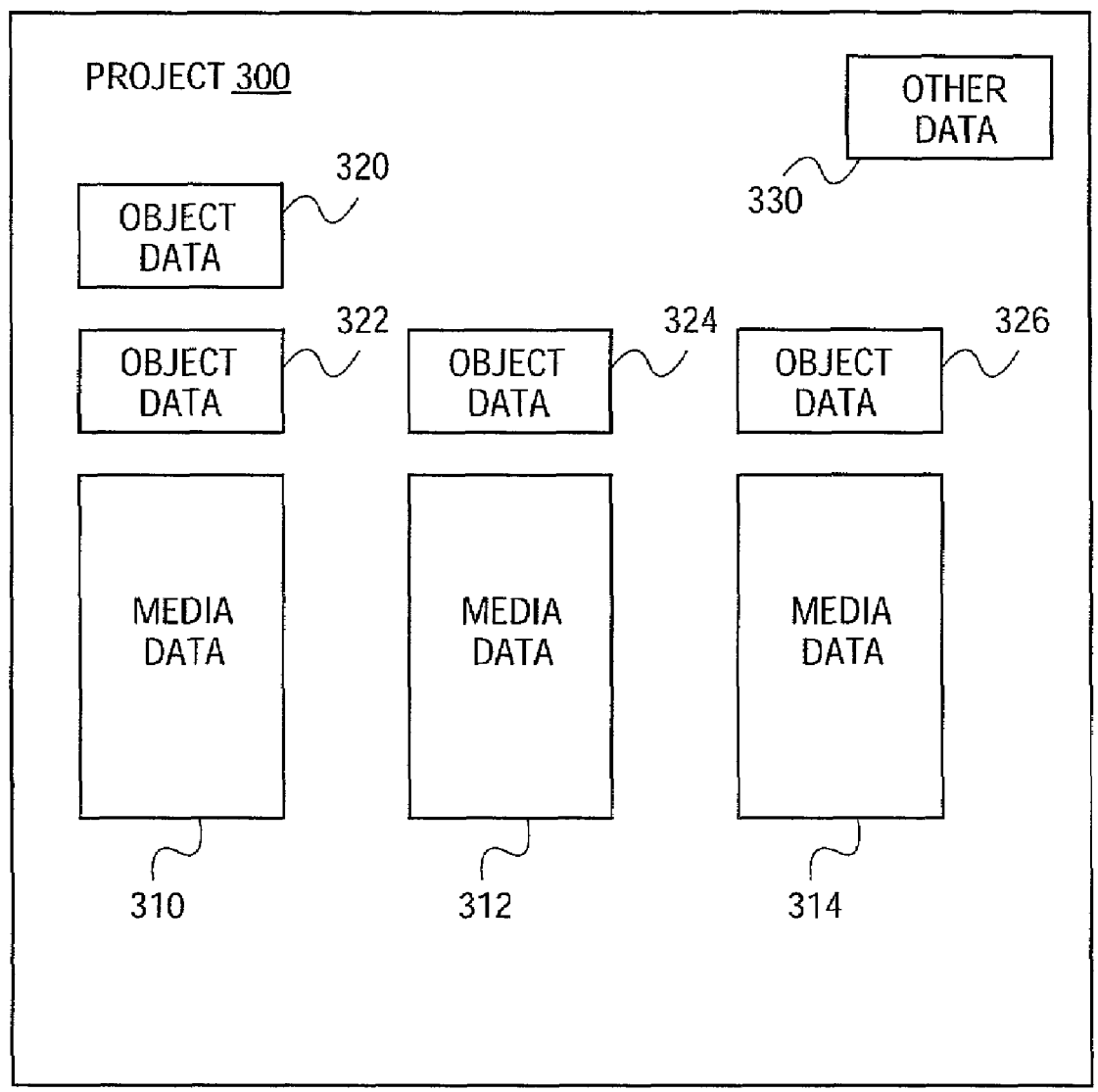
FIG. 3 is a diagram of a project.
Figure 4:
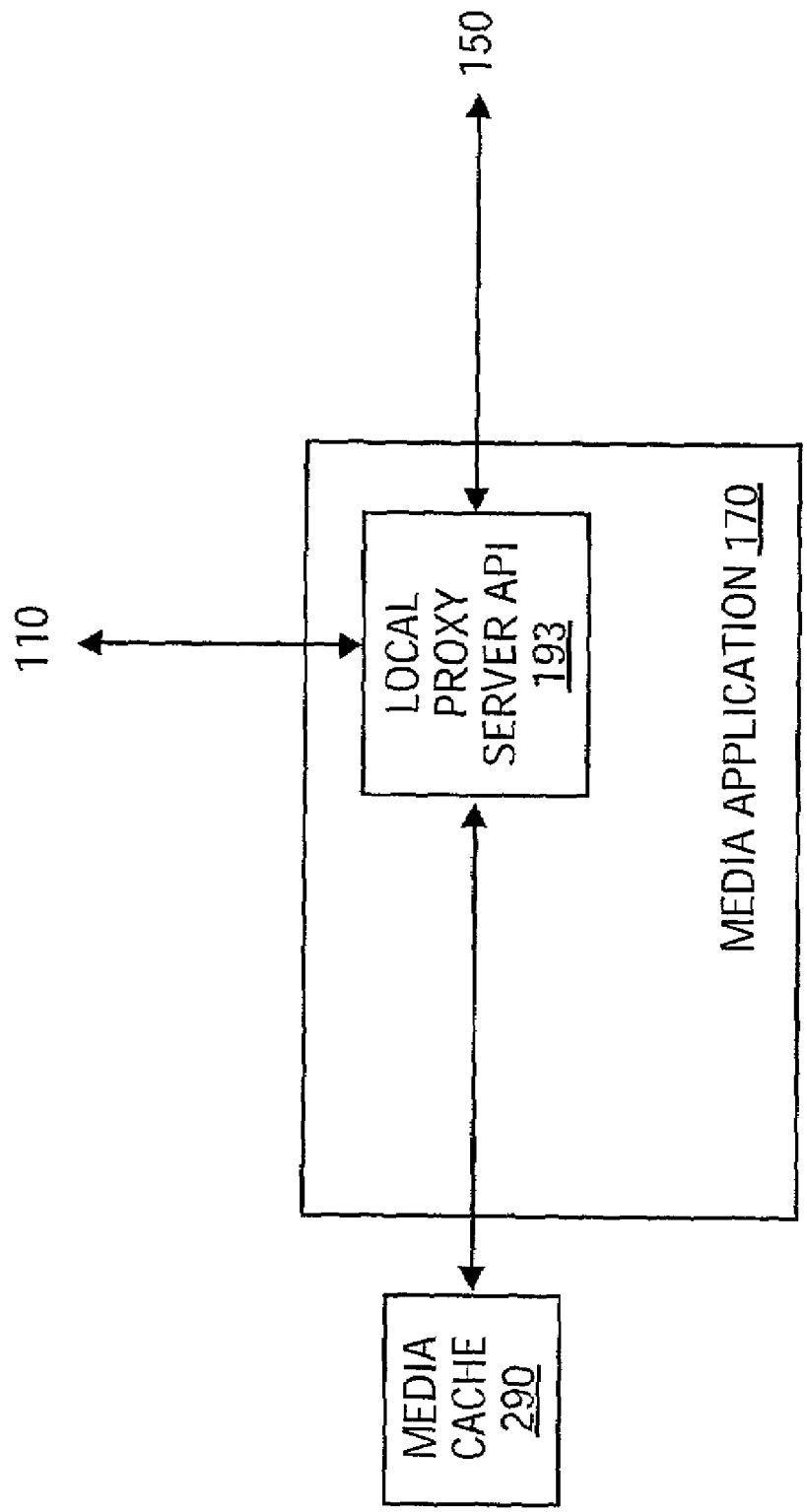
FIG. 4 is a diagram of a media application.

Memory 265 may store instructions or code for implementing a program (e.g., media application 170) and an application programming interface (API) (e.g., local proxy server API 193 as shown in FIG. 4). CPU 255 may execute instructions for media application 170 and local proxy server API 193 to perform the methods described herein. Cache memory 290 may store media data (or data files) for storing or downloading to and from central server 110 and/or local proxy server 150. Cache memory 290 may store other types of data, e.g., object data as shown in FIG. 3, to allow LAN users 130-140 to collaborate on a project. Computer system 200 may also receive input via input/output (I/O) devices 270. Examples of I/O devices 270 include a keyboard, pointing device, or other appropriate input devices. I/O devices 270 may also represent external storage devices or computing systems or subsystems. Computer system 200 may also present information (e.g., media data or user interfaces as described in FIGS. 11-14) via a display 280.

Project

FIG. 3 is a diagram of a project 300. Project 300 may include project data stored on central server 110, e.g., in media storage 185. LAN users 130-140 and WAN user 120 may collaborate on project 300. That is, LAN users 130-140 may work together to create a data file representing, for example, a musical or multimedia arrangement. Such collaboration may be conducted in concurrent sessions or individually by each user at different instances in time.

Referring to FIG. 3, project 300 includes sets 320, 322, 324, and 326 of object data tied to sets 310, 312 and 314 of media data. In particular, sets 320 and 322 of object data are associated with set 310 of media data; set 324 of object data is associated set 312 of media data; and set 326 of object data is associated with set 314 of media data. Project 300 may also include a set 330 of other data, e.g., this may contain a list of all users collaborating on project 300.

Sets 310, 312, and 314 of media data are components of project 300 in which user modifications or changes can be made. Sets 320, 322, 224, and 326 of object data are "meta data" associated with sets 310, 312, and 314 of media data. Object data may represent a change or modification of an element of media data. For example, a change or modification to set 310 of media data can be embodied in sets 320 and 322 of object data.

Referring back to FIG. 1, to collaborate on project 300 between LAN users 130-140, LAN user 130 can post set 310 of media data on local proxy server 150 and sets 320 and 322 of object data on central server 110. Local proxy server 150 can store set 310 of media data on local storage 190 and on central server 110 thereby allowing set 310 of media data to be accessible locally for LAN users 135 and 140. Central server 110 notifies LAN users 135 and 140 of the posted set 310 of media data and sets 320 and 322 of object data. LAN users 130 and 140 can thus download set 310 of posted media data from local proxy server 150 and sets 320 and 322 of object data from central server 110. Alternatively, sets 320 and 322 of object data can also be posted and downloaded to and from local proxy server 150.

Media Application

FIG. 4 shows media application 170 in greater detail. For LAN users 130-140 or WAN user 120, media application 170 includes a local proxy server application program interface (API) 193 ("API 193"). API 193 is a software component tied into media application 170. API 193 includes one or more functions, procedures, routines, or sub-routines that implement processes to interface media application 170 to a media cache 290, central server 110, and local proxy server 150. Alternatively, the processes performed by API 193 can be implemented by media application 170 alone. Media cache 290 can store project 300 data for media application 170.

API 193 can be configured or programmed to implement the methods described below. For example, the collaboration system of Rocket Network, Inc. can be implemented as API 193 and be configured or programmed to selectively enable local proxy server 150 for use by LAN users 130-140 using the techniques described in FIGS. 11-14. In one implementation, local proxy server 150 can be selectively enabled for use by LAN users by configuring or programming API 193 to recognize and to post/download media data and/or object data to and from local proxy server 150.

To post media data, API 193 can send media data stored in media cache 290 to central server 110 or local proxy server 150. To download posted media data, API 193 can copy posted media from central server 110 or local proxy server 150 and store the data in media cache 290. The above process can be implemented for object data.

To communicate with central server 110 or local proxy server 190, API 193 may use a File Transfer Protocol (FTP) or other standard file sharing protocols to transfer and access media data to and from central server 110 or local proxy server 150. API 193 can be seamlessly integrated into media application 170 such that media application 170 is unaware that media data is being stored or downloaded from local proxy server 150.

API 193 may perform other types of functions. For example, API 193 may determine whether posted media data 180 is stored on local proxy server 150 and access it from local proxy server 150 if requested by media application 170. If API 193 determines that posted media data 180 is not stored on local proxy server 150, API 193 may download posted media data 180 from central server 110. API 193 can also determine if media data (or data files) cached or stored in media cache 290 is stored on local proxy server 150. Additionally, API 193 may provide interfaces (e.g., as shown in FIGS. 11-14) for a user to configure preferences for local proxy server 150, to display media data, to provide a status of the storing or downloading process.

Object and Media Flow

Figure 5:
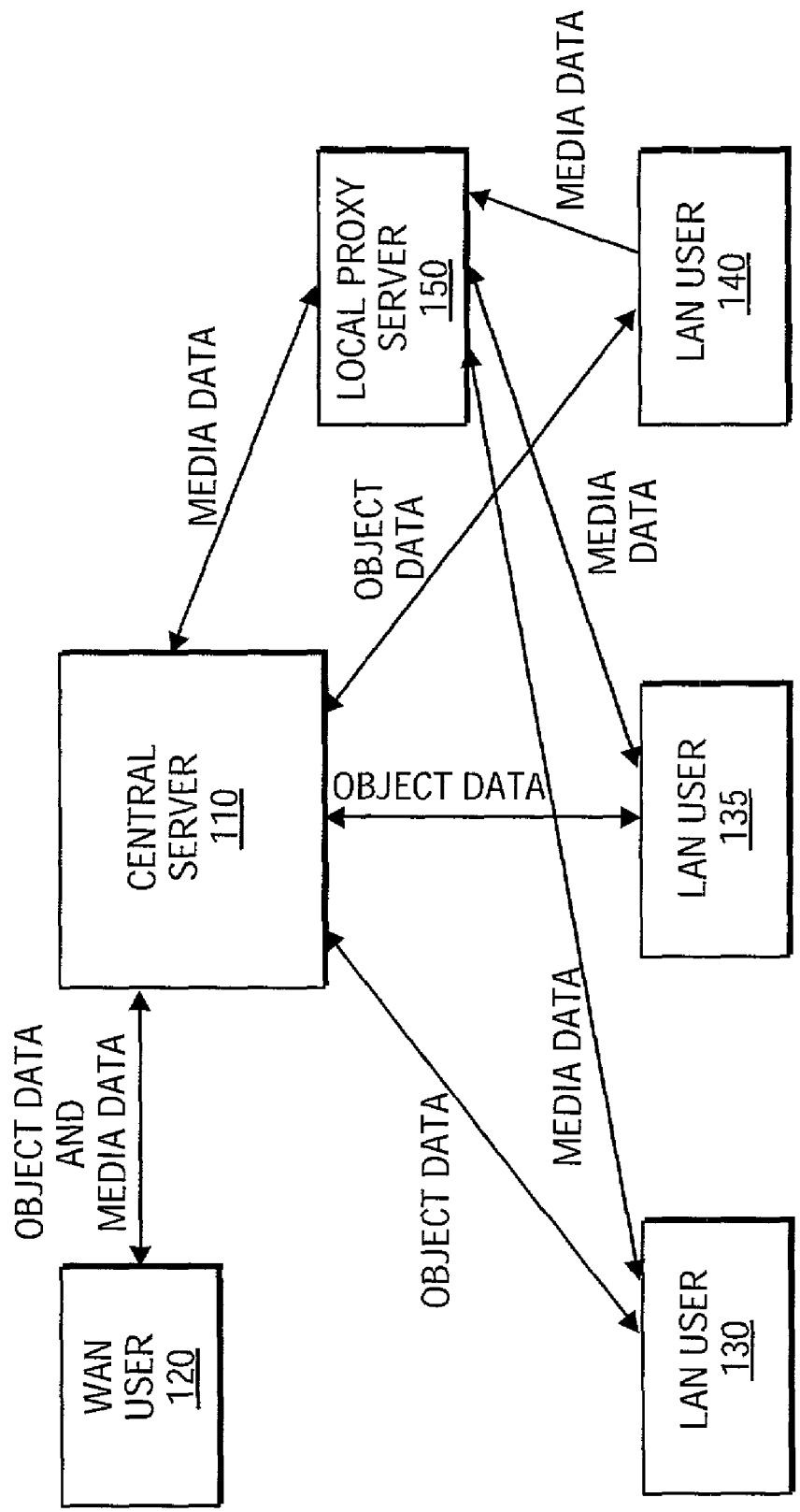
FIG. 5 is a diagram illustrating media data and object data flow for LAN users collaborating on a project.

FIG. 5 is a diagram of media data and object data flow for LAN users 130-140 collaborating on a project. LAN users 130-140 and WAN user 120 are shown collaborating on a project (e.g., project 300). Local proxy server 150 can act as a client to central server 110 and act as an intermediary between central server 110 and LAN users 130-140.

Referring to FIG. 5, LAN users 130-140 store or post media ("media data") on local proxy server 150. In this manner, media data being stored or posted by LAN users 130-140 can be accessed locally on LAN 190 via local proxy server 150. Local proxy server 150 stores or posts media data from LAN users 130-140 on central server 110. LAN users 130-140 can avoid posting or storing media data directly to central server 110 by using local proxy server 150. Local proxy server 150 can also copy or mirror media data being stored on central server 110. For example, if WAN user 120 posts or stores media data for a project on central server 120, local proxy server 150 can copy the media data being posted by WAN user 120. In this manner, posted media data by WAN user 120 can be accessed locally by LAN users 130-140 instead of downloading the media data from central server 110.

To make changes to a project, LAN users 130-140 or WAN user 120 can store or post object data to central server 110. As described previously, object data can embody a specific change to media data. Alternatively, LAN users 130-140 can also post or store object data to local proxy server 150, which stores or posts the object data to central server 110 for the local area users. Local proxy server 150 can also copy or mirror object data being stored on central server 110 for access by LAN users 130-140. LAN users 130-140 and WAN user 120 can also access object data from central server 110.

Storing Media Data on Local Proxy Server

The following flow diagrams detail methods for storing media data on local proxy server 150. The following methods can be implemented for storing or mirroring other types of data on local proxy server 150 including object data, text data, image data, graphical data, binary data, compressed data, rendered data, or any combination of the above data.

Figure 6:
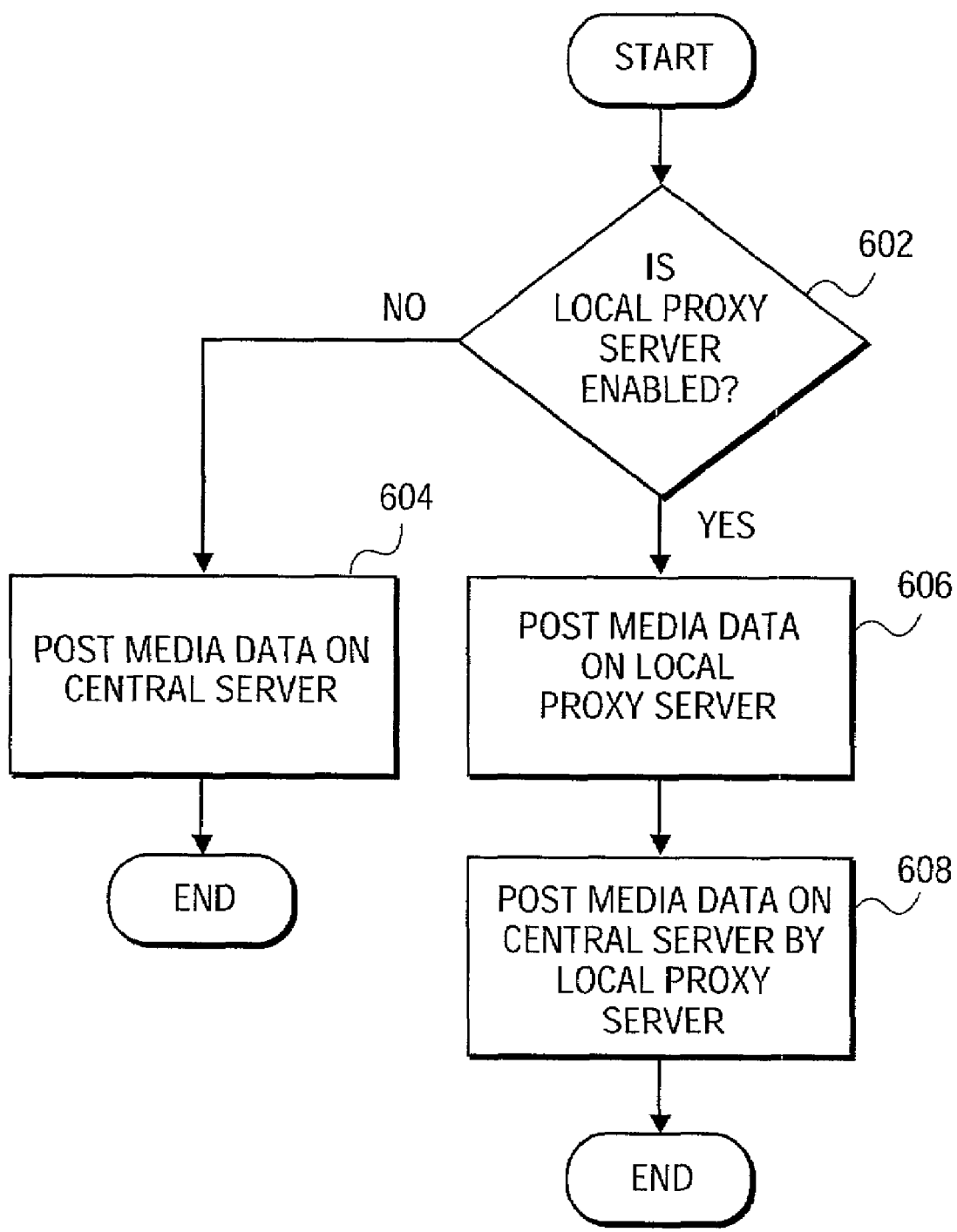
FIG. 6 is a flow diagram of stages of a first method for storing media data on a local proxy server.

FIG. 6 is a flow diagram of stages of a first method for storing media data on local proxy server 150. This method can be implemented for one or more data files containing media data.

After the process begins, a check is made to determine if local proxy server 150 is enabled (stage 602). This check can be made to determine if a local proxy server is present on LAN 190. LAN users 130-140 or any other local area user can enable local proxy server 150 connected in LAN 190 by using interfaces such as those shown in FIGS. 11-14. If local proxy server 150 is not enabled, media data is stored or posted on central server 110 (stage 604).

If local proxy server 150 is enabled, the media data is stored or posted on local proxy server 150 (stage 606). For example, a LAN user can determine if local proxy server 150 is enabled within LAN 190, and, if enabled, store media data on local proxy server 150. A user can queue media data to be stored on local proxy server 150. The user can also inform central server 110 and local proxy server 150 when it is done storing media data.

Local proxy server 150 then stores or posts the media data on central server 110 (608). Local proxy server 150 can queue media data to be stored on central server 110. Local proxy server 150 can inform central server 110 when it is done storing media data on it.

Local proxy server 150 is thus responsible for storing or posting the media data to central server 150 for LAN users 130-140. Local proxy server 150 can also copy or download media data being stored or posted on central server 110 by other users connected on WAN 160. Local proxy server 150 can operate behind the scenes of the collaboration between LAN users 130-150 and WAN user 120 to copy data being stored on central server 110. For example, media data 180 being stored on central server 110 can be mirrored on local proxy server 150 for access by LAN users 130-140 via LAN 190.

Figure 7:
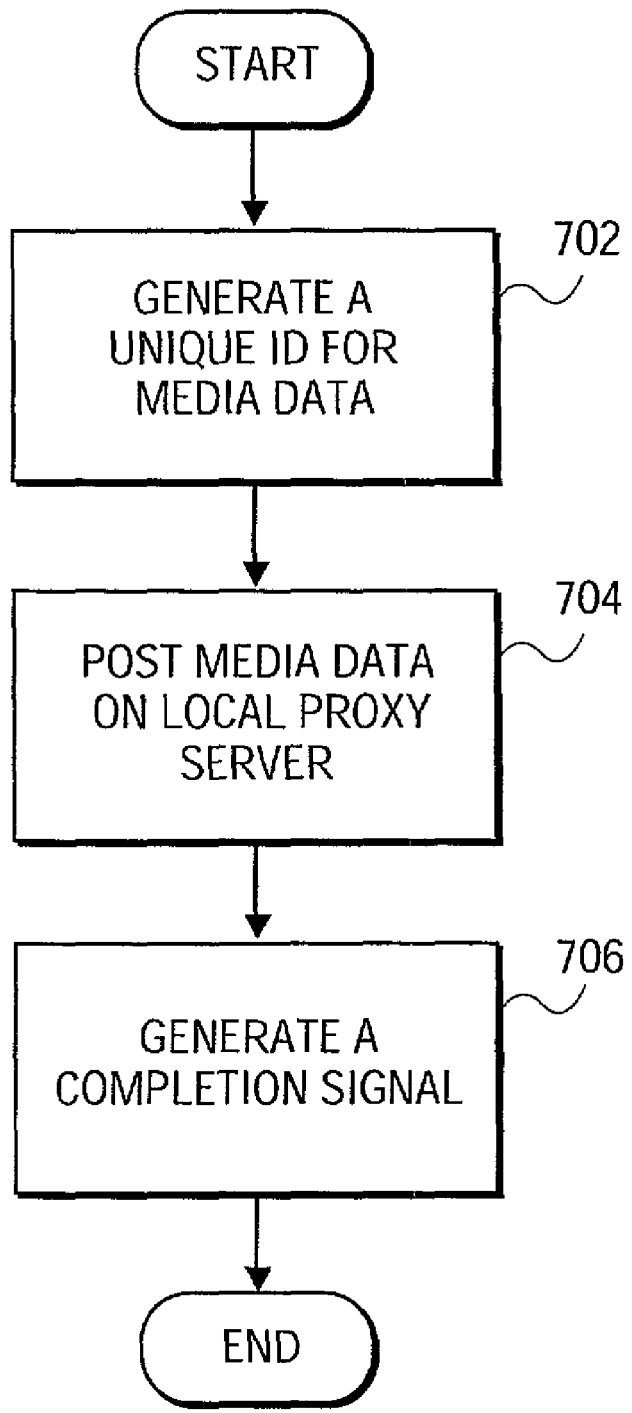
FIG. 7 is a flow diagram of stages of a second method for storing media data on a local proxy server.

FIG. 7 is a flow diagram of stages of a second method for storing media data on local proxy server 150. This method can be implemented for one or more data files containing media data.

After the process begins, a unique identifier (ID) or file name is generated for media data (stage 702). Examples of a unique identifier may include a globally unique ID (GUID) identifying a version or attribute of the media data. By using a GUID, media data on local proxy server 150 can be differentiated. Alternatively, a unique ID can be generated for groups of media data, e.g., by a common project. That is, folders can be created to store common media data and only a unique folder name is required.

In one implementation, if a standard filing system (such as UNIX) is used to organize and store the media data, attributes such as: "File Creator", "User Name", "File Creation Time", and "Original File Name" can be used. With these attributes, a unique file name or ID can be generated concatenating the Creator User Account Name, the File Creation Time and the Original File Name. (e.g. Matt1-123456789456123-datafile1.doc). This ensures that the name of each media data will be unique. By using such an ID generating process, an exemplary folder hierarchy is shown below.

Parent Directory (root directory on the local proxy server)
    Project1 (folder)
    Aaron1-123456789123-datafile1.doc (file)
    Mike1-894576890532-datafile1.doc (file)
    Project2 (folder)
    Aaron1-72384732874-picture.jpg (file)
    Mike1-77773234234-mynotes.txt (file)
    Project3 (folder) . . . .

As shown in the above example, each folder name (e.g., Project1 to Project3) is unique and media data name within the folder is unique. After a unique ID is generated for the media data, the media data is posted on local proxy server 150 with its unique ID (stage 704). While the media data is being posted or stored, an indication can be provided to LAN users 130-140 that posting of the media data has not yet been completely posted. After the media data is completely posted on local proxy server 150, a completion signal is generated (stage 706). This completion signal notifies other LAN users 130-140 that the media data has been completely posted or stored on local proxy server 150 and is ready for downloading.

By using the completion signal, a user can avoid downloading an incomplete copy of media data. The completion signal can be indicated, e.g., by appending ".cmpit" to the unique ID for the media data, storing an indication in a database record, or checking the media data size on local proxy server 150 with the required file size for the media data. Other examples of the completion signal include local proxy server 150 broadcasting a signal that the media data has been successfully posted. The completion signal may also be based on media data attributes.

Downloading Media Data by Local Area User

The following flow diagrams detail methods for downloading media data from local proxy server 150. The following methods describe using a completion signal to ensure that stored media data is completely downloaded. The following methods can be implemented for downloading other types of data including object data, text data, image data, graphical data, binary data, compressed data, rendered data, or any combination of the above data.

Figure 8:
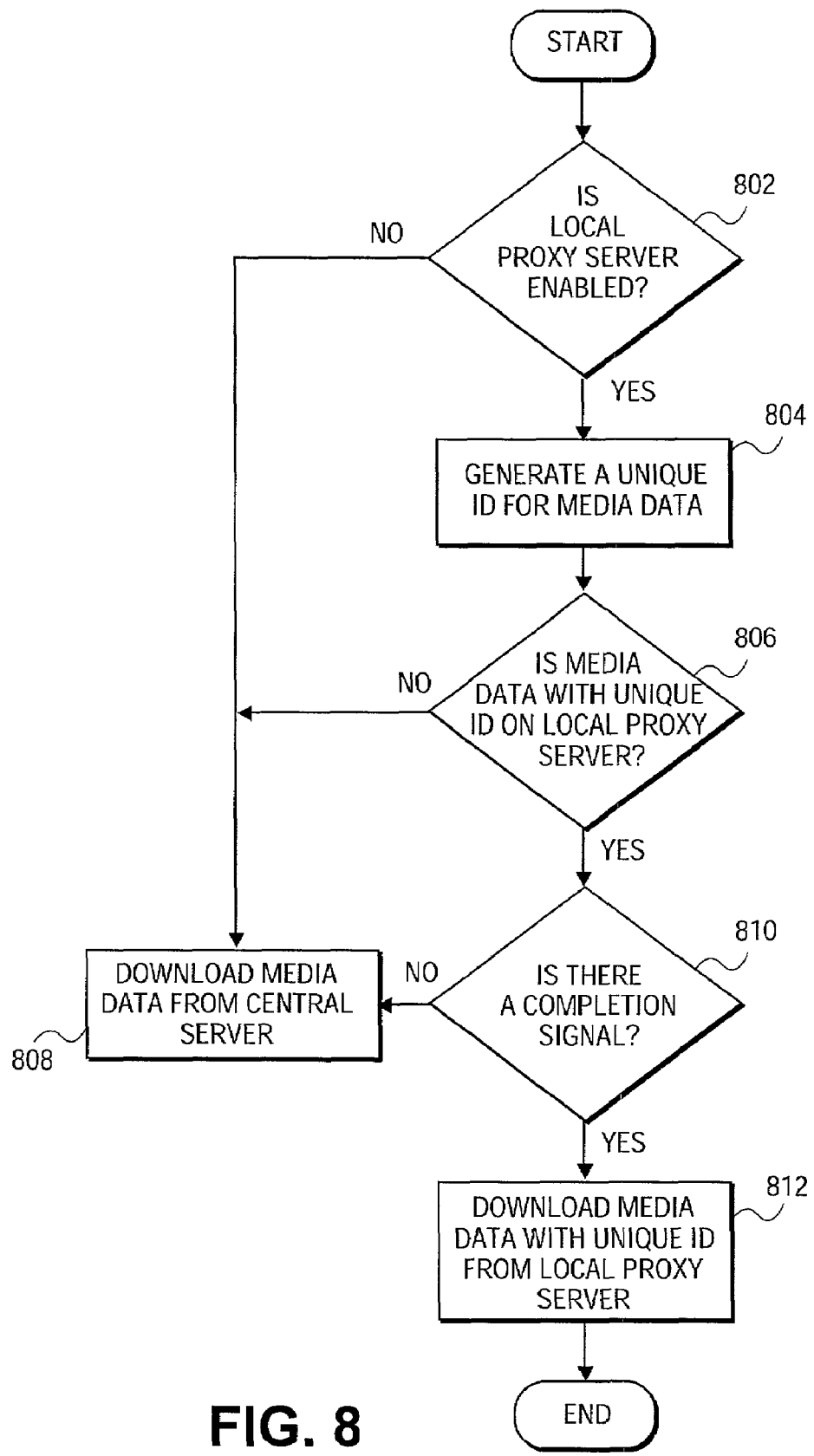
FIG. 8 is a flow diagram of stages of a first method for downloading media data by a local area user.

FIG. 8 is a flow diagram of stages of a first method for downloading media data from local proxy server 150. This method can be implemented with one or more data files containing media data.

Initially, a LAN user is requesting media data to be downloaded. A check is made to determine if local proxy server 150 is enabled (stage 802). If local proxy server 150 is not enabled, the requested media data is downloaded from central server 110 (stage 808). If local proxy server 150 is enabled, a unique ID for the media data is generated as described in FIG. 7 (stage 804). This stage is optional if the unique ID has been previously generated. The unique ID can be generated for the media data before implementing this method.

A check is then made to determine if the media data having the unique ID is stored on local proxy server 150 (stage 806). If no media data having the unique ID is stored on local proxy server 150, the media data is downloaded from central server 110 (stage 808). If the media data having the unique ID is stored on local proxy server 150, a check is made to determine if there is a completion signal for the media data (stage 810). If there is no completion signal, the media data is downloaded from central server 110 (stage 808). If there is a completion signal, the media data is downloaded from local proxy server 150 (stage 812). The media data can then be stored in a cache media 290 within one of the LAN users 130-140 or other storage devices.

Figure 9:
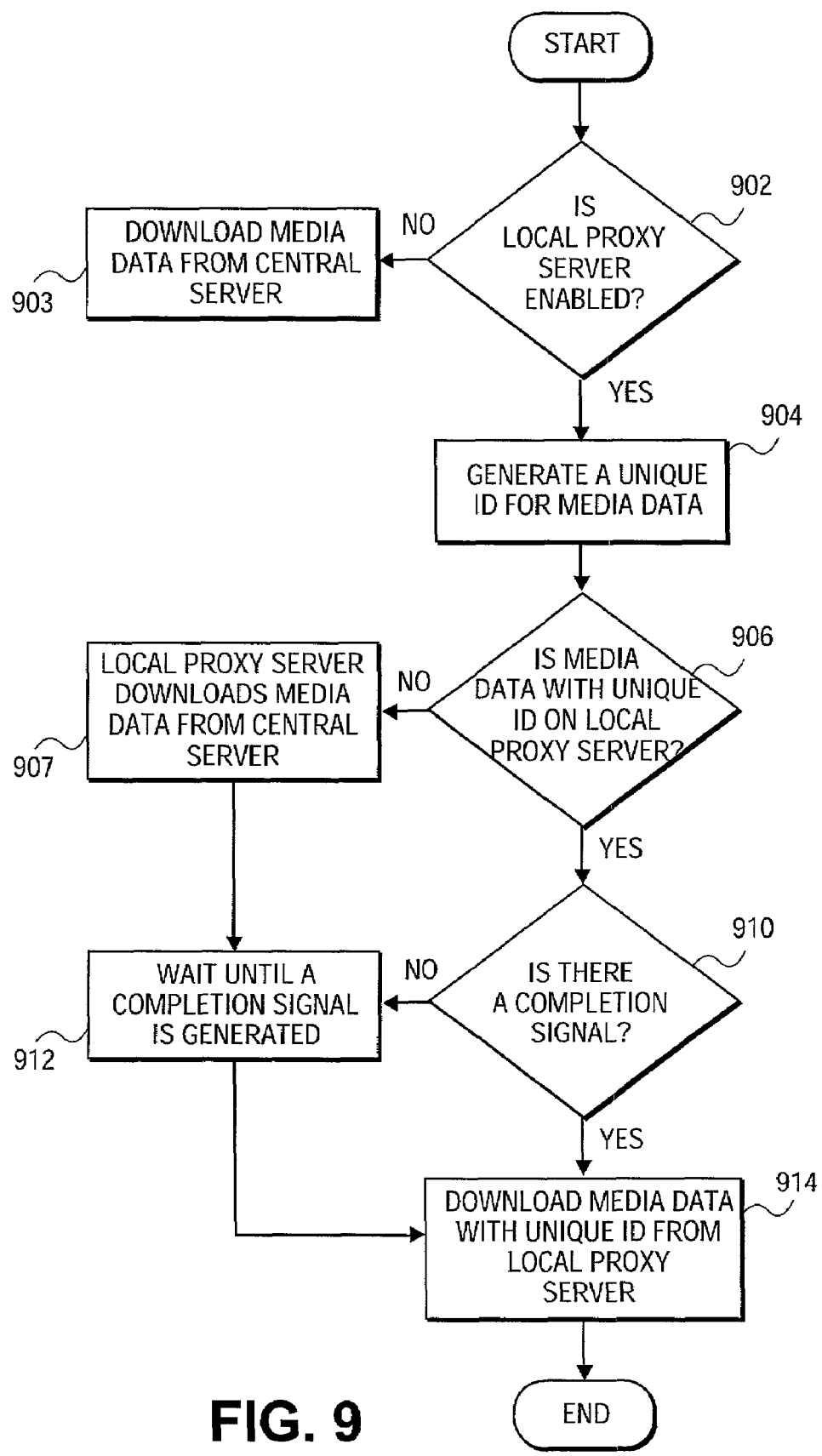
FIG. 9 is a flow diagram of stages of a second method for downloading media data by a local area user.

FIG. 9 is a flow diagram of stages of a second method for downloading media data from local proxy server 150. This method can be implemented for one or more data files containing media data.

Initially, a LAN user is requesting media data to be downloaded. A check is made to determine if local proxy server 150 is enabled (stage 902). If local proxy server 150 is not enabled, the requested media data is downloaded from central server 110 (stage 903). If local proxy server 150 is enabled, a unique ID for the media data is generated as described in FIG. 7 (stage 904). This stage is optional if the unique ID has been previously generated. The unique ID can be generated for the media data before implementing this method.

A check is then made to determine if the media data having the unique ID is stored on local proxy server 150 (stage 906). If no media data having the unique ID is stored on local proxy server 150 and local proxy server 150 is enabled, the media data is copied from central server 110 by local proxy server 150 (stage 907). That is, local proxy server 150 downloads the requested media data with the unique ID from central server 150. From stage 907, the process continues to stage 912 to wait for a completion signal.

If media data having the unique ID is stored on local proxy server 150, a check is made to determine if there is a completion signal (stage 910). If there is no completion signal, the process waits until a completion signal is generated or found (stage 912). The completion signal indicates that the media data is completely stored on local proxy server 1150. Alternatively, during stage 912, a streaming process can be implemented to download segments of the requested media data as soon as the segments become available on local proxy server 150.

A user may receive status updates regarding the requested media data. For example, the user may receive an update that the requested media data is currently being stored on local proxy server 150 and local proxy server 150 will inform the user when the media data is completely stored using a completion signal.

Once the completion signal is found, the media data is downloaded from local proxy server 150 (stage 914). The above method can be modified such that the media data is downloaded from local proxy server 150 within a predetermined time period. The downloaded media data can then be stored in a cache media 290 within one of the LAN users 130-140 or other storage devices.

Downloading Media Data by Non-Local Area User

Figure 10:
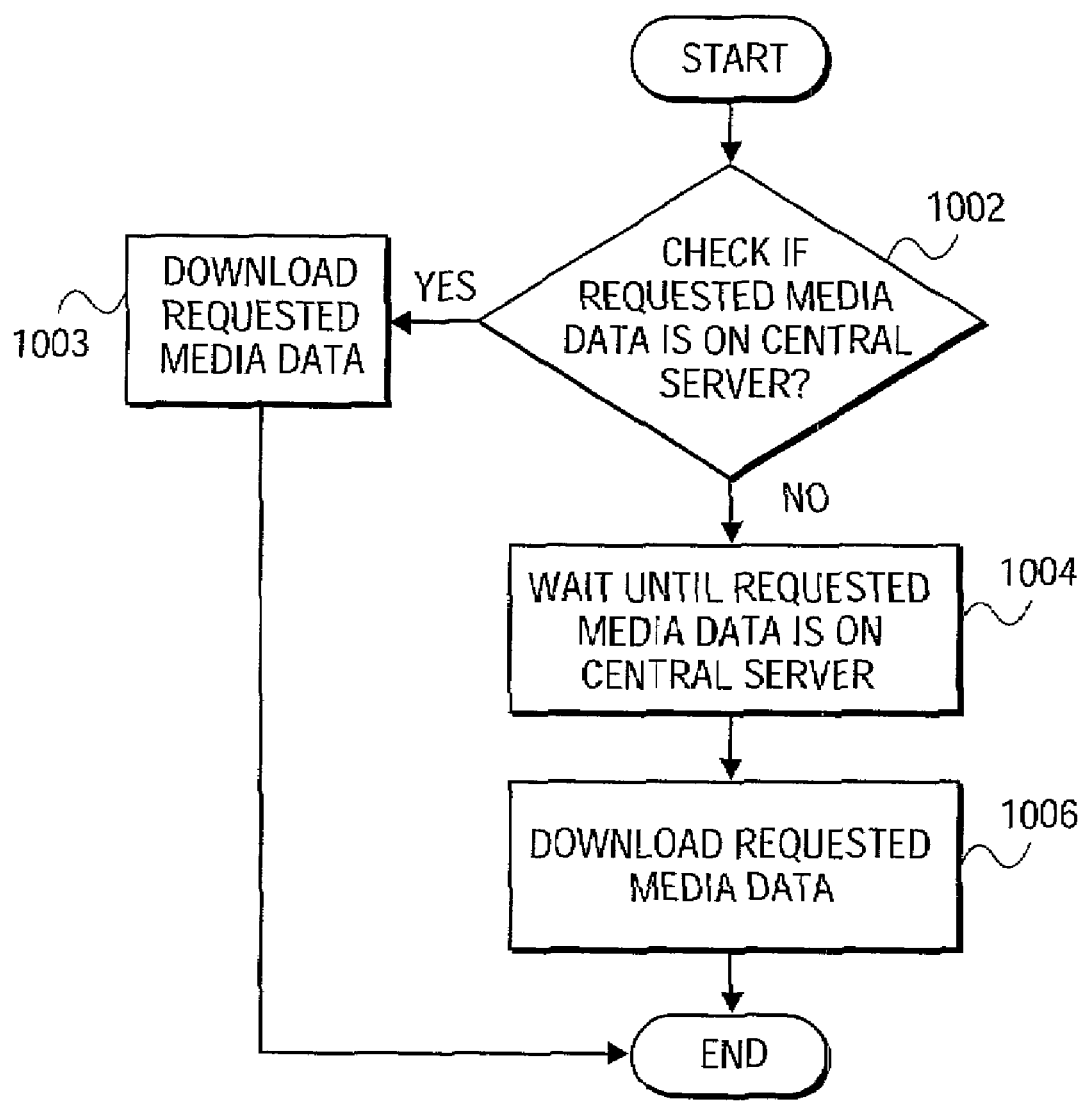
FIG. 10 is a flow diagram of stages of a method for downloading media data by a non-local area user.

FIG. 10 is a flow diagram of stages of a method for downloading media data from central server 110. The following method can be implemented for one or more data files containing media data.

Initially, a user (not accessible to a local proxy server) is requesting media data to be downloaded from central server 110. A check is made to determine if the requested media data is on central server 110 (stage 1002). If the requested media data is on central server 110, the requested media data is downloaded from central server 110 (stage 1003). If the requested media data is not on central server 110, the user waits until the requested data is on central server 110 (stage 1004). For instance, a local proxy server may be in the process of storing or posting the media data to central server 110.

During this wait process, the user may receive status updates regarding the progress of the requested media data. Alternatively, during this stage, a streaming process can be implemented to download segments of the requested media data as soon as the segments become available on central server 110. Once the requested media is on central server 110 (which can be indicated by a completion signal), the requested media data is downloaded from central server 110 (stage 1006).

Selectively Enabling Local Proxy Server

FIGS. 11-14 illustrate exemplary user interfaces 1110, 1210, 1310, and 1410, which may be provided by media application 170 or API 193 for LAN users 130-140, to selectively-enable local proxy server 150 in performing the methods described above.

Figure 11:
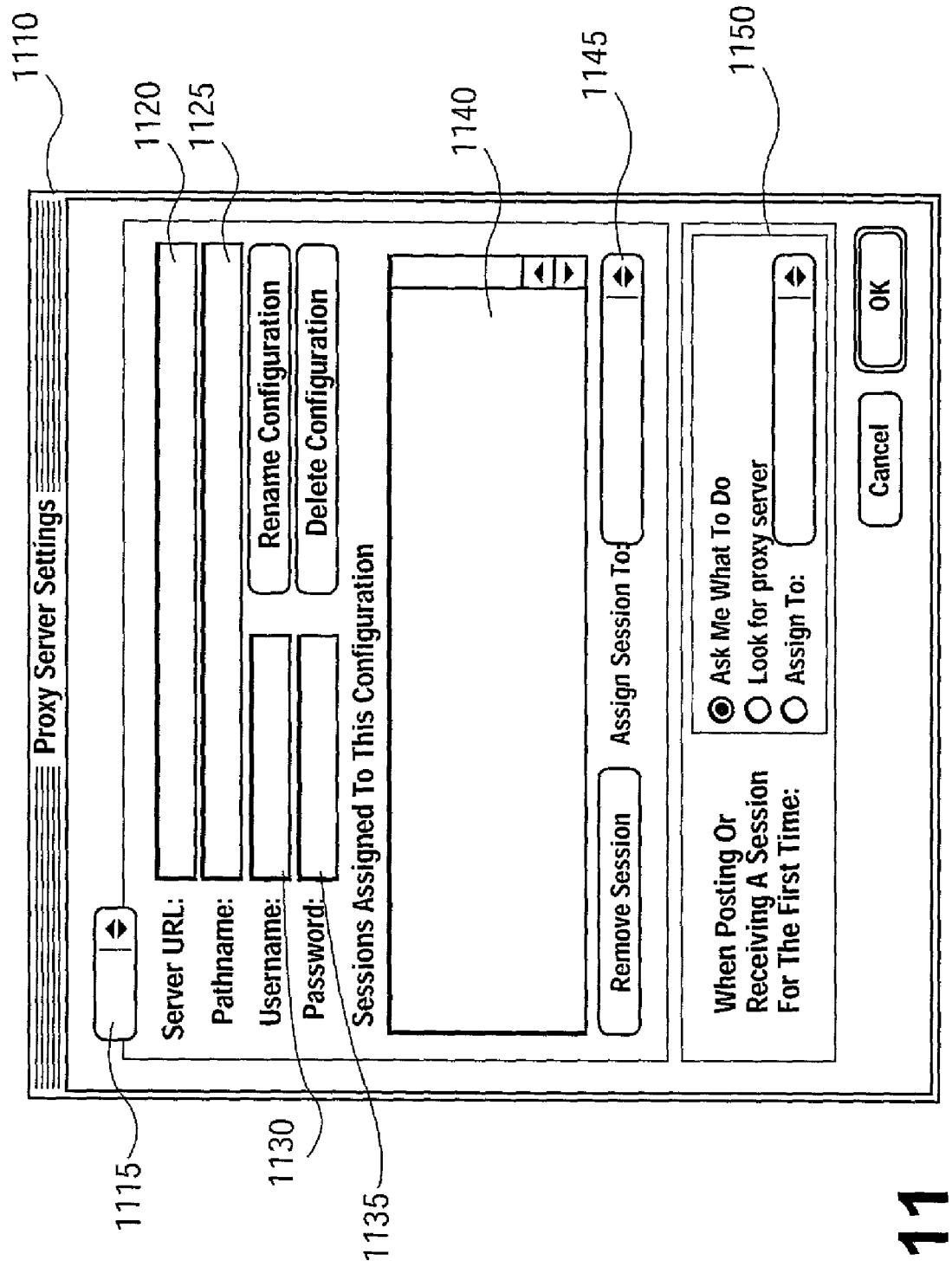
FIG. 11 is a diagram of an exemplary local proxy server settings interface.

Referring to FIG. 11, user interface 1110 depicts a local proxy server (or mirror settings) dialog interface for selectively enabling local proxy server 150. User interface 1110 includes a plurality of inputs 1115 through 1150 allowing a user to configure settings for posting or downloading media data. Media application 170 can provide a menu option or an access button to initiate user interface 1110.

At interface 1110, a user can input "Server URL", "Pathname", "Username", and "Password" information at inputs 1120, 1125, 1130, and 1135. A window 1140 can display sessions or projects assigned to the user. When posting or receiving media data for a session for the first time, user interface 1110 presents an options window 1150 allowing a user to choose one of the following: "Ask Me What to Do", "Don't Mirror", or "Assign To:". If the "Ask Me What to DO" option is selected, a help type window is displayed informing the user of options that can be selected for user interface 1110. If the "Don't Mirror" option is selected, local proxy server 150 is not enabled and media data is posted directly on central server 110.

Figure 12:
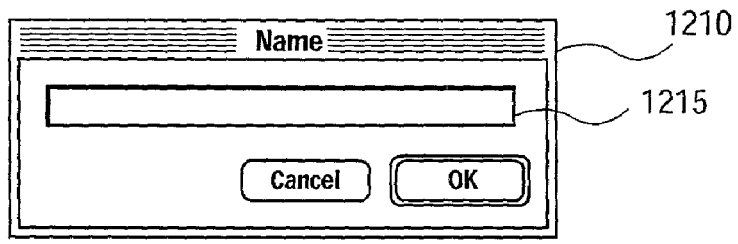
FIG. 12 is a diagram of an exemplary name dialog interface.

If "Assign To:" option is selected, a drop down menu is provided that allows a user to choose one of the following options: "Add Configuration", "Remove Session", "Rename Configuration", "Delete Configuration", or "Save Configuration". If the "Add Configuration" option is selected, interface 1210, as shown in FIG. 12, is provided to the user. The user can then add a name at input 1215 for the new configuration to be created. If the "Remove Session" option is selected, a list of session names is provided in which the user can select to have removed from interface 1110. If the "Rename Configuration", "Delete Configuration", and "Save Configuration" options are selected, an interface is provided to allow the user to perform the corresponding function. With the above options, a user can configure settings to copy and download media from local proxy server 150.

Figure 13:
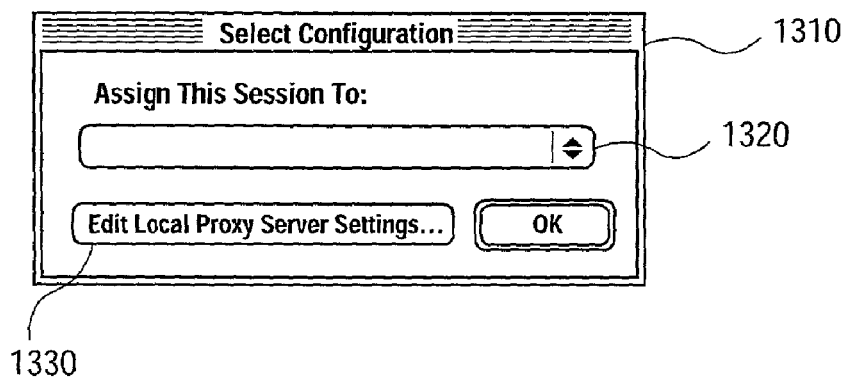
FIG. 13 is a diagram of an exemplary select configuration interface.
Figure 14:
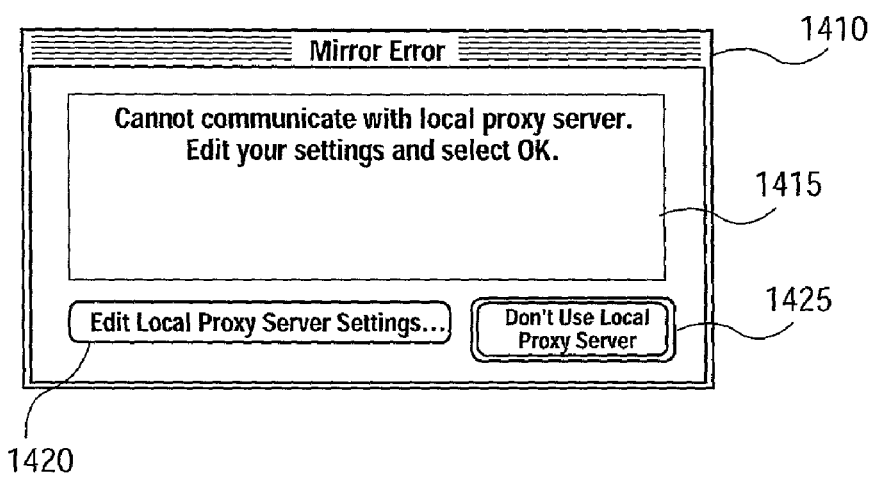
FIG. 14 is a diagram of an exemplary local proxy server error dialog interface.

Referring to FIG. 13, user interface 1310 depicts a select configuration dialog for creating or loading a session. A user can assign or select a session using input 1320. An "Edit Local Proxy Server Settings" option 1330 is provided for a user. If a user selects option 1330, the user can change or edit the local proxy server settings for the selected session as shown by interface 1110 of FIG. 11. Referring to FIG. 14, user interface 1410 is provided if there is an error in communicating with local proxy server 150. For example, window 1415 can display a message such as "Cannot communicate with Local Proxy Server. Edit your settings and select OK." Thus, user interface 1410 provides a "Edit Cache Mirror Settings" option 1420 or "Don't Use Local Proxy Server" option 1425 for a user to select. The user can select option 1420 to change settings to correct the error or can select option 1425 to avoid communicating with local proxy server 150.

The above implementations can have many variations without departing from the spirit and scope of the invention. For example, the above methods can be modified to post media data and object data to only local proxy server 150 and media data or data file ID information is passed to central server 110 that distributes the ID information. In this case, media data and object data are posted and downloaded to and from local proxy server 150. Additionally, for the above methods, different or varying versions of media data can be posted on local proxy server 150, e.g., media data can be posted in a compressed format or with low quality resolution.

Furthermore, although aspects of the invention are described in which programs, application, modules, functions, routines, or sub-routines are stored in memory, such memory may include computer-readable media such as, for example, hard disks, floppy disks, CD-ROMs; a carrier wave from the Internet; or other forms of RAM or ROM. Similarly, the methods of the invention may conveniently be implemented in software and/or hardware modules that are based upon the flow diagrams of FIGS. 6 through 10 and user interfaces shown in FIGS. 11 through 14.

No particular programming language has been indicated for carrying out the various methods described above because it is considered that the operations, stages and procedures described herein and illustrated in the accompanying drawings are sufficiently enabling to practice the invention. Moreover, any number of computers and operating systems may be used to practice the invention. Each user of a particular computer will be aware of the language and tools which are most useful for that user's needs and purposes to practice and implement the invention. Accordingly, the scope of the present invention is defined by the appended claims rather than the foregoing description.

What is claimed is:

1. A method for implementing collaboration between a plurality of users operating a media application for editing media data, including users interconnected via a first network and connected to a second network, the second network including a central server and the first network including a selectively enabled local proxy server, the method comprising:

in response to an instruction from the media application operated by a user from the plurality of users to store media data:

determining if the local proxy server is enabled to permit storage of media data on the local proxy server from the user; and transmitting the media data from the user to the local proxy server for storage on the local proxy server and transmitting the media data from the local proxy server to the central server for storage on the central server if the local proxy server is enabled.

2. The method of claim 1 wherein the first network includes a local area network (LAN) and the second network includes a wide area network (WAN).

3. The method of claim 1 wherein storing the media data includes storing of at least one data file containing media data.

4. The method of claim 3 further comprising:
generating a unique identifier for each data file; and
storing each data file on the local proxy server, and accessing each stored data file using the identifier for the data file.

5. The method of claim 1 further comprising selectively enabling the local proxy server by a user.

6. The method of claim 1 further comprising generating a notification of the storing of the media data and transmitting the notification to the users.

7. The method of claim 6 further comprising streaming the media data to a user requesting the media data based on the notification.

8. The method of claim 6 further comprising generating a completion signal when the media data is stored on the local proxy server.

9. The method of claim 8 further comprising:
receiving the notification; and
downloading the media data from the local proxy server if the local proxy server has been enabled and the completion signal has been generated.

10. The method of claim 8 further comprising:
receiving the notification; and
if the local proxy server has been enabled, downloading the media data from the local proxy server only upon determination that the completion signal has been generated.

11. The method of claim 10 further comprising retrieving the media data from the central server if the local proxy server is not enabled.

12. The method of claim 11 further comprising retrieving the media data from the central server if the completion signal is not received within a predetermined period of time.

13. The method of claim 12 further comprising generating a completion signal after the media data is stored on the local proxy server.

14. The method of claim 1 further comprising:
requesting media data from the local proxy server if enabled by at least one user; and
if the requested media data is not located on the local proxy server, copying the requested media data from the central server by the local proxy server and sending the requested media data to the user by the local proxy server.

15. A method for implementing collaboration between a plurality of users operating a media application for editing media data, each of the users having access to a central server and to at least one selectively enabled local proxy server, wherein each selectively enabled local proxy server is accessible to only a subset of the users, the method comprising:
in response to an instruction from the media application operated by a user from the plurality of users to store media data:
determining if the local proxy server is enabled to permit storage of media data on the local proxy server from the user; and
transmitting the media data from the user to the local proxy server for storage on the local proxy server and transmitting the media data from the local proxy server to the central server for storage on the central server if the local proxy server is enabled.

16. The method of claim 15 wherein storing the media data includes storing of at least one data file containing media data.

17. The method of claim 16 further comprising:
generating a unique identifier for each data file; and
storing each data file on the local proxy server, and accessing each stored data file using the identifier for the data file.

18. The method of claim 15 further comprising selectively enabling the local proxy server by a user.

19. The method of claim 15 further comprising generating a notification of the storing of the media data and transmitting the notification to the users.

20. The method of claim 19 further comprising streaming the media data to a user requesting the media data based on the notification.

21. The method of claim 19 further comprising generating a completion signal when the media data is stored on the local proxy server.

22. The method of claim 21 further comprising:
receiving the notification; and
downloading the media data from the local proxy server if the local proxy sewer has been enabled and the completion signal has been generated.

23. The method of claim 19 further comprising:
receiving the notification; and
if the local proxy server has been enabled, downloading the media data from the local proxy server only upon determination that the completion signal has been generated.

24. The method of claim 23 further comprising retrieving the media data from the central server if the local proxy server is not enabled.

25. The method of claim 24 further comprising retrieving the media data from the central server if the completion signal is not received within a predetermined period of time.

26. The method of claim 25 further comprising generating a completion signal after the media data is stored on the local proxy server.

27. The method of claim 15 further comprising:
requesting media data from the local proxy server if enabled by at least one user; and
if the requested media data is not located on the local proxy server, copying the requested media data from the central server by the local proxy server and sending the requested media data to the user by the local proxy server.

28. A method for implementing collaboration between a plurality of users operating a media application for editing media data, each of the users having access to a central server and to at least one selectively enabled local proxy server, the method comprising:
in response to an instruction from the media application operated by a user from the plurality of users to store media data:
determining if the local proxy server is enabled to permit storage of media data on the local proxy server from the user;

if the local proxy server is enabled, transmitting media data from the user to the local proxy server for storage on the local proxy server, the media data including an identifier; and transmitting the media data with the identifier from the local proxy server to the central server for storage on the central server.

29. A method for implementing collaboration between a plurality of users on a network operating a media application for editing media data, each of the users having access to a central sewer, the method comprising:

connecting a local proxy server to the network;

selectively enabling the local proxy server to permit storage of media data on the local proxy server from a user from the plurality of users;

configuring at least one of the users to recognize the enabled local proxy server and to transmit media data for the media application to the enabled local proxy server for storage on the enabled local proxy server, and to transmit media data for the media application to the central server for storage on the central server if the local proxy server is not enabled.

30. A system for implementing collaboration for editing media data, comprising:

a plurality of users, each operating a media application for editing media data and interconnected via a first network and connected to a second network, the second network including a central server and the first network including a selectively enabled local proxy server, wherein each user comprises a memory storing instructions for implementing the media application to process media data and a processor configured to execute the instructions to perform:

in response to an instruction from the media application operated by the user to store media data, determining if the local proxy server is enabled to permit storage of media data on the local proxy server from the user; and transmitting the media data from the user to the local proxy server for storage on the local proxy server if the local proxy server is enabled otherwise transmitting the media data to the central server for storage on the central server if the local proxy server is not enabled.

31. The system of claim 30 wherein the first network includes a local area network (LAN) and the second network includes a wide area network (WAN).

32. The system of claim 31 wherein the processor is configured to execute the instructions to perform storing of at least one data file containing media data.

33. The system of claim 32 wherein the processor is configured to execute the instructions to perform:

generating a unique identifier for each data file; and storing each data file on the local proxy server, and accessing each stored data file using the identifier for the data file.

34. The system of claim 31 wherein the processor is configured to execute the instructions to perform selectively enabling the local proxy server by a user.

35. The system of claim 31 wherein the processor is configured to execute the instructions to receive a notification of the storing of the media data on at least one of the central server and local proxy server.

36. The system of claim 35, wherein the processor is configured to execute the instructions to receive streaming of the media data based on the notification.

37. The system of claim 35 wherein the processor is configured to execute the instructions to perform receiving a completion signal when the media data is stored on the local proxy server.

38. The system of claim 37 wherein the processor is configured to execute the instructions to perform:

receiving the notification; and downloading the media data from the local proxy server if the local proxy server has been enabled and the completion signal has been generated.

39. The system of claim 37 wherein the processor is configured to execute the instructions to perform:

receiving the notification; and if the local proxy server has been enabled, downloading the media data from the local proxy server only upon determination that the completion signal has been generated.

40. The system of claim 39 wherein the processor is configured to execute the instructions to perform retrieving the media data from the central server if the local proxy server is not enabled.

41. The system of claim 40 wherein the processor is configured to execute the instructions to perform retrieving the media data from the central server if the completion signal is not received within a predetermined period of time.

42. The system of claim 41 wherein the processor is configured to execute the instructions to perform receiving a completion signal after the media data is stored on the local proxy server.

43. A system for implementing collaboration for editing media data, comprising:

a plurality if users, each operating a media application for editing media data, each of the users having access to a central server and to at least one selectively enabled local proxy server, each of the local proxy server being accessible to only a subset of the users, each user comprising a memory storing instructions for implementing the media application to process media data and a processor configured to execute the program instructions to perform:

in response to an instruction from the media application operated by the user to store media data, determining if the local proxy server is enabled to permit storage of media data on the local proxy server from the user; and transmitting the media data from the user to the local proxy server for storage on the local proxy server and transmitting the media data from the local proxy server to the central server for storage on the central server if the local proxy server is enabled.

44. The system of claim 43 wherein the processor is configured to execute the instructions to perform storing of at least one data file containing media data on the central server and local proxy server.

45. The system of claim 44 wherein the processor is configured to execute the instructions to perform:

generating a unique identifier for the data file;

storing the data file on the local proxy server; and accessing the data file using the identifier.

46. The system of claim 43 wherein the processor is configured to execute the instructions to perform selectively enabling the local proxy server by a user.

47. The system of claim 43 wherein the processor is configured to execute the instructions to perform generating a notification of the storing of the media data on the central server and local proxy server and transmitting the notification to the users.

48. The system of claim 47 wherein the processor is configured to execute the instructions to receive streaming of the media data based on the notification.

49. The system of claim 47 wherein the processor is configured to execute the instructions to perform generating a completion signal when the media data is stored on the local proxy sewer.

50. The system of claim 49 wherein the processor is configured to execute the instructions to perform:
receiving the notification; and
downloading the media data from the local proxy server if the local proxy server has been enabled and the completion signal has been generated.

51. The system of claim 49 wherein the processor is configured to execute the instructions to perform:
receiving the notification; and
if the local proxy server has been enabled, downloading the media data from the local proxy server only upon determination that the completion signal been generated.

52. The system of method of claim 51 wherein the processor is configured to execute the instructions to perform retrieving the media data from the central server if the local proxy server is not enabled.

53. The system of claim 51 wherein the processor is configured to execute the instructions to perform retrieving the media data from the central server if the completion signal is not received within a predetermined period of time.

54. The system of claim 53 wherein the processor is configured to execute the instructions to perform generating a completion signal after the media data is stored on the local proxy server.

55. A method for implementing collaboration between a plurality of users operating an application for editing project data, including users interconnected via a first network and connected to a second network, the second network including a central server and the first network including a selectively enabled local proxy server, the method comprising:
in response to an instruction from the application operated by a user from the plurality of users to store project data:
determining if the local proxy server is enabled to permit storage of project data on the local proxy server from the user; and
transmitting the project data from the user to the local proxy server for storage on the local proxy server and transmitting the project data from the local proxy server to the central server for storage on the central server if the local proxy server is enabled.

56. A method for implementing collaboration between a plurality of users operating an application for editing project data, each of the users having access to a central server and to at least one selectively enabled local proxy server, wherein each selectively enabled local proxy server is accessible to only a subset of the users, the method comprising:
in response to an instruction from the application operated by a user from the plurality of users to store project data:
determining if the local proxy server is enabled to permit storage of project data on the local proxy server from the user; and
transmitting the project data from the user to the local proxy server for storage on the local proxy server and transmitting the project data from the local proxy server to the central server for storage on the central server if the local proxy server is enabled.

57. A method for implementing collaboration between a plurality of users operating an application for editing project data, each of the users having access to a central server and to at least one selectively enabled local proxy server, the method comprising:
in response to an instruction from the application operated by a user from the plurality of users to store project data:
determining if the local proxy server is enabled to permit storage of project data on the local proxy server from the user;
if the local proxy server is enabled, transmitting project data from the user to the local proxy server for storage on the local proxy server, the project data including an identifier, and transmitting the project data from the local proxy server to the central server for storage on the central server.

58. A method for implementing collaboration between a plurality of users on a network operating an application for editing project data, each of the users having access to a central server, the method comprising:
connecting a local proxy server to the network;
selectively enabling the local proxy server to permit storage of media data on the local proxy server from a user from the plurality of users;
configuring at least one of the users to recognize the enabled local proxy server and to transmit project data for the application to the enabled local proxy server for storage on the enabled local proxy server, and to transmit project data for the application to the central server for storage on the central server if the local proxy server is not enabled.

59. A computer-readable medium containing instructions, which if executed by a computing system, cause the computing system to perform a method for implementing collaboration between a plurality of users on a network operating a media application for editing media data, each of the users having access to a central server, the method comprising:
connecting a local proxy server to the network;
selectively enabling the local proxy server to permit storage of media data on the local proxy server from a user from the plurality of users; and
configuring at least one of the users to recognize the enabled local proxy server and to transmit media data for the media application to the enabled local proxy server for storage on the enabled local proxy server, and to transmit media data for the media application to the central server for storage on the central server if the local proxy server is not enabled.

* * * * *